United States Patent
Habram (10) Patent No.: US 10,517,421 B2
(45) Date of Patent: Dec. 31, 2019

(54) COFFEE AND TEA BREWING SYSTEM AND METHOD

(71) Applicant: Leann Habram, West Bend, WI (US)

(72) Inventor: Leann Habram, West Bend, WI (US)

(*) Notice: Subject to any disclaimer, the term of this patent is extended or adjusted under 35 U.S.C. 154(b) by 0 days.

(21) Appl. No.: 15/434,041

(22) Filed: Feb. 15, 2017

(65) Prior Publication Data

US 2017/0295987 A1 Oct. 19, 2017

Related U.S. Application Data

(60) Provisional application No. 62/295,212, filed on Feb. 15, 2016.

(51) Int. Cl.
*A47J 31/44* (2006.01)
*A47J 31/38* (2006.01)
*A23F 3/18* (2006.01)
*A23F 5/26* (2006.01)
*A47J 31/20* (2006.01)

(52) U.S. Cl.
CPC .............. *A47J 31/38* (2013.01); *A23F 3/18* (2013.01); *A23F 5/26* (2013.01); *A47J 31/20* (2013.01); *A47J 31/4407* (2013.01)

(58) Field of Classification Search
CPC ......... A23F 5/26; A47J 31/20; A47J 31/4407; A47J 31/4403; A47J 31/44; A47J 31/00; A47J 31/06; A47J 31/38
See application file for complete search history.

(56) References Cited

U.S. PATENT DOCUMENTS

| | | | |
|---|---|---|---|
| 376,319 A | 1/1888 | Lane | |
| 2,140,328 A | 12/1938 | Mozier | |
| 2,311,759 A | 2/1943 | Johnson | |
| 2,749,834 A | 6/1956 | Hiscock | |
| 3,307,474 A | 3/1967 | Kasher | |
| 3,565,641 A | 2/1971 | King | |
| 4,632,023 A | 12/1986 | King | |
| 4,948,601 A | 8/1990 | Serbu | |
| D335,423 S * | 5/1993 | Naft | D7/323 |
| 5,351,604 A | 10/1994 | King et al. | |
| 5,363,745 A | 11/1994 | Lin | |

(Continued)

FOREIGN PATENT DOCUMENTS

CA 2379099 * 9/2003 ............ A47J 27/16

*Primary Examiner* — Hong T Yoo
(74) *Attorney, Agent, or Firm* — Blynn L. Shideler; Krisanne Shideler; BLK Law Group (57) ABSTRACT

A coffee and tea brewing system includes a carafe assembly including a container configured to hold the brewed coffee or tea; a brewing assembly configured to be selectively coupled to the container of the carafe assembly for brewing of coffee or tea and selectively removed from the container of the carafe assembly when serving the brewed coffee or tea, the brewing assembly comprising a mesh filter assembly configured to allow for separation of the coffee grounds or tea leaves from the brewed coffee or tea, and an agitation mechanism configured to selectively agitate the coffee grounds or tea leaves and associated brewing coffee or tea during brewing; and a heating assembly configured to support the carafe assembly and selectively add heat thereto. The agitation is through manual manipulation of a paddle adjacent the mesh filter assembly. A method of brewing coffee or tea is disclosed using the system.

14 Claims, 11 Drawing Sheets

(56) References Cited

U.S. PATENT DOCUMENTS

| | | | |
|---|---|---|---|
| 5,479,849 A | 1/1996 | King et al. | |
| 5,544,566 A | 8/1996 | Bersten | |
| 5,895,595 A * | 4/1999 | Haden | A47J 31/4439 |
| | | | 219/428 |
| 5,979,299 A | 11/1999 | Hornsby et al. | |
| 6,009,793 A | 1/2000 | Blankenship et al. | |
| 6,422,133 B1 | 7/2002 | Brady | |
| 6,692,780 B1 | 2/2004 | Sandin | |
| 7,270,050 B2 | 9/2007 | Glucksman et al. | |
| 7,673,555 B2 | 3/2010 | Nosler et al. | |
| 7,858,135 B2 | 12/2010 | Radosav | |
| 8,074,591 B2 | 12/2011 | Butcher et al. | |
| 8,168,243 B1 | 5/2012 | Eaton | |
| 8,313,644 B2 | 11/2012 | Harris et al. | |
| 9,192,261 B2 | 11/2015 | Katz et al. | |
| 9,289,092 B2 | 3/2016 | Gagne | |
| 2007/0137495 A1* | 6/2007 | Talbert | A47J 31/20 |
| | | | 99/286 |
| 2007/0151461 A1 | 7/2007 | Edmark et al. | |
| 2008/0168906 A1 | 7/2008 | Pan et al. | |
| 2009/0071343 A1 | 3/2009 | Helde | |
| 2014/0072684 A1* | 3/2014 | Madden | A47J 31/005 |
| | | | 426/431 |
| 2014/0374365 A1* | 12/2014 | Nazzer | B01D 29/01 |
| | | | 210/808 |
| 2015/0157049 A1* | 6/2015 | Fogelin | A23L 2/72 |
| | | | 426/495 |
| 2015/0196158 A1* | 7/2015 | Velasquez | A47J 31/38 |
| | | | 99/297 |

* cited by examiner

COFFEE AND TEA BREWING SYSTEM AND METHOD

RELATED APPLICATIONS

This application claims priority to U.S. provisional patent application Ser. No. 295,212 filed Feb. 15, 2017, invented by Leann Habram, entitled "Coffee and Tea Brewing System and Method" which is incorporated herein by reference in its entirety.

BACKGROUND OF THE INVENTION

Field of the Invention

The present invention relates to a coffee and tea brewing system and an associated method of brewing and serving coffee and tea.

Background Information

Coffee is a brewed drink prepared from roasted coffee beans, which are the seeds of berries from the Coffea plant. The plant is native to subtropical Africa and some islands in southern Asia. The plant was exported from Africa to countries around the world and coffee plants are now cultivated in over 70 countries, primarily in the equatorial regions of the Americas, Southeast Asia, India, and Africa. The two most commonly grown are the highly regarded arabica, and the less sophisticated but stronger and hardier robusta. Once ripe, coffee beans are picked, processed, and dried. Dried coffee beans are roasted to varying degrees, depending on the desired flavor. Roasted beans are ground and brewed to produce coffee as a beverage.

Coffee is slightly acidic and can have a stimulating effect on humans because of its caffeine content. Coffee is one of the most popular drinks in the world. It can be prepared and presented in a variety of ways (e.g., espresso, cappuccino, cafe latte, etc.). It is usually served hot, although iced coffee is also served. Clinical studies indicate that moderate coffee consumption is benign or mildly beneficial in healthy adults, with continuing research on whether long-term consumption inhibits cognitive decline during aging or lowers the risk of some forms of cancer.

The history of coffee goes at least as far back as the 10th century, with a number of reports and legends surrounding its first use. The native (undomesticated) origin of coffee is thought to have been Ethiopia. The earliest substantiated evidence of either coffee drinking or knowledge of the coffee tree is from the 15th century, in the Sufi monasteries of Yemen. By the 16th century, it had reached the rest of the Middle East, Persia, Turkey, Horn of Africa, and northern Africa. Coffee then spread to the Balkans, Italy, the rest of Europe, to Indonesia and then to America The first coffeehouse in Europe was opened in Vienna in 1683 after the Battle of Vienna, by using supplies from the spoils obtained after defeating the Turks. The officer who received the coffee beans, Polish military officer of Ukrainian origin Jerzy Franciszek Kulczycki, opened the coffee house and helped popularize the custom of adding sugar and milk to the coffee. Melange is the typical Viennese coffee, which comes mixed with hot foamed milk and a glass of water.

According to Leonhard Rauwolf's 1583 account, coffee became available in England no later than the 16th century, largely through the efforts of the British East India Company and the Dutch East India Company. The first coffeehouse in England was opened in St. Michael's Alley in Cornhill. The Turkish proprietor was Pasqua Rosée, the servant of Daniel Edwards, a trader in goods. Edwards imported the coffee and assisted Rosée in setting up the establishment. Oxford's Queen's Lane Coffee House, established in 1654, is still in existence today. By 1675, there were more than 3,000 coffeehouses throughout England, but there were many disruptions in the progressive movement of coffeehouses between the 1660s and 1670s. During the enlightenment, these early English coffee houses became gathering places used for deep religious and political discussions among the populace. This practice became so common, and potentially subversive, that Charles II made an attempt to crush coffee houses in 1675.

Gabriel de Clieu brought coffee seedlings to Martinique in the Caribbean circa 1720. Those sprouts flourished and 50 years later there were 18,680 coffee trees in Martinique enabling the spread of coffee cultivation to Haiti, Mexico and other islands of the Caribbean. The territory of Santo Domingo (now Hispaniola, comprising Haiti and the Dominican Republic) began coffee cultivated around 1734, and by 1788 it supplied half the world's coffee. Coffee had a major influence on the geography of Latin America. The French colonial plantations relied heavily on African slave laborers. However, the dreadful conditions that the slaves worked in on coffee plantations were a factor in the soon-to-follow Haitian Revolution. The coffee industry never fully recovered there.

Coffee also found its way to the Isle of Bourbon, now known as Reunion, in the Indian Ocean. The plant produced smaller beans and was deemed a different variety of arabica known as var. Bourbon. The Santos coffee of Brazil and the Oaxaca coffee of Mexico are the progeny of that Bourbon tree. Circa 1727, the King of Portugal sent Francisco de Melo Palheta to French Guiana to obtain coffee seeds to become a part of the coffee market. Francisco initially had difficulty obtaining these seeds, but he captivated the French Governor's wife and she sent him enough seeds and shoots to commence the coffee industry of Brazil. In 1893, the coffee from Brazil was introduced into Kenya and Tanzania (Tanganyika), not far from its place of origin in Ethiopia, 600 years prior, ending its transcontinental journey.

Meanwhile, coffee had been introduced to Brazil in 1727, although its cultivation did not gather momentum until independence in 1822. After this time, massive tracts of rainforest were cleared first from the vicinity of Rio and later Sao Paulo for coffee plantations. In the same time frame, after the Boston Tea Party of 1773, large numbers of Americans switched to drinking coffee during the American Revolution because the British habit of drinking tea had become unpatriotic.

Cultivation was taken up by many countries in the latter half of the 19th century, and almost all involved the large-scale displacement and exploitation of the indigenous Indian people. Harsh conditions led to many uprisings, coups and bloody suppression of peasants. The notable exception was Costa Rica, where lack of ready labor prevented the formation of large farms. Smaller farms and more egalitarian conditions ameliorated unrest over the 19th and 20th centuries.

Brazil became the largest producer of coffee in the world by 1852 and it held that status ever since. It dominated world production, exporting more coffee than the rest of the world combined, from 1850 to 1950. The period since 1950 saw the widening of the playing field due to the emergence of several other major producers, most notably Colombia, Ivory Coast, Ethiopia, and, most recently, Vietnam, which overtook Colombia and became the second-largest producer in 1999 and reached 15% market share by 2011.

With this background it becomes clear that the history of coffee, like the drink itself, is quite rich. With the significance of this drink it is not surprising that there have been a number of developments to assist in the brewing and serving of coffee. One of these improvements is known as a French Press. A French press, also known as a cafetière, cafetière à piston, Cafeteria, press pot, coffee press, or coffee plunger, is a coffee brewing device often attributed to have been patented by Italian designer Attilio Calimani in 1929.

A French press generally requires coffee of a coarser grind than does a drip brew coffee filter. In a French press, coffee is brewed by placing the ground coffee in the empty beaker and adding hot (93-96 degrees Celsius, 200-205 degrees Fahrenheit) water, in proportions of about 28 grams (1 ounce) of coffee grounds to 450 ml (15 fluid ounces) of water, more or less to taste. The water is added and then covered and allowed to brew. The total brewing time from beginning to end is about two to four minutes, depending on the size of the press. The plunger is pressed to separate the grounds and hold them at the bottom of the beaker and the brew is poured out. One may wish to decant the coffee into a serving vessel at this point; if the brewed coffee is allowed to remain in the beaker with the used grounds, the coffee can become astringent and bitter, though this is an effect that some users of the French press consider desirable. Other approaches, such as cold-brewing, require several hours of contact between the water and the grounds to achieve the desired extraction.

Over the years, the French press has undergone several design modifications. The first coffee press, which may have been made in France, was the modern coffee press in its rudimentary form: a metal or cheesecloth screen fitted to a rod that users would press into a pot of boiling water. The coffee press was patented by Milanese designer Attilio Calimani in 1929. It underwent several design modifications through Faliero Bondanini, who patented his own version in 1958 and began manufacturing it in a French clarinet factory called Martin SA, where its popularity grew. The device was further popularized across Europe by a British company by the name of Household Articles Ltd., and most notably, the Danish tableware and kitchenware company, Bodum. The modern French press consists of a narrow cylindrical beaker, usually made of glass or clear plastic, equipped with a metal or plastic lid and plunger that fits tightly in the cylinder and has a fine wire or nylon mesh filter.

French presses are more portable and self-contained than other coffee makers. Travel mug versions exist, which are made of tough plastic instead of the more common glass, and have a sealed lid with a closable drinking hole. Some versions are marketed to hikers and backpackers not wishing to carry a heavy, metal percolator or a filter using drip brew. Other versions include stainless steel, insulated presses designed to keep the coffee hot, similar in design to thermos flasks.

One variation relevant to the present discussion are known French Presses which use a "pull" design: the coffee grounds are placed in a mesh support or basket, which is then pulled into the lid after brewing, trapping the grounds away from the brewed coffee. Others French Press designs produce a similar effect by having shutters that can be closed via the top of the press, sealing the grounds off from the coffee entirely. French presses are also sometimes used to make cold brew coffee.

In the same way as coffee, a French press can also be used in place of a tea infuser to brew loose tea. The tea will continue to steep even after the plunger is depressed, which may cause the tea remaining in the press to become excessively bitter. This can be prevented by pouring the tea into a teapot instead of directly pouring it into the cup. The present system is discussed in connection with coffee but may be equally effective for brewing tea. The history of tea is likely more extensive than that of coffee and certainly as interesting, but not needed to place the present invention in context.

In addition to that discussed above the general patent literature also gives an overview of the developments over time such as discussed in U.S. Pat. Nos. 376,319; 2,140,328; 2,311,759; 2,749,834; 3,307,474; 3,565,641; 4,632,023; 4,948,601; 5,351,604; 5,363,745; 5,479,849; 5,544,566; 5,979,299; 6,009,793; 6,422,133; 6,692,780; 7,270,050; 7,673,555; 7,858,135; 8,074,591; 8,168,243; 8,313,644; 9,192,261; and 9,289,092 and in U.S. patent publication numbers 2007/0151461; 2008/0168906 and 2009/0071343, which patents and publications are incorporated herein by reference. There remains a need for a simple elegant and effective system for brewing and serving coffee and tea.

SUMMARY OF THE INVENTION

The present invention addresses the deficiencies of the prior art and provides a small, lightweight portable coffee and tea brewing device.

A coffee and tea brewing system according to the present invention includes a carafe assembly including a container configured to hold the brewed coffee or tea; a brewing assembly configured to be selectively coupled to the container of the carafe assembly for brewing of coffee or tea and selectively removed from the container of the carafe assembly when serving the brewed coffee or tea, the brewing assembly comprising a mesh filter assembly configured to allow for separation of the coffee grounds or tea leaves from the brewed coffee or tea, and an agitation mechanism configured to selectively agitate the coffee grounds or tea leaves and associated brewing coffee or tea during brewing; and a heating assembly configured to support the carafe assembly and selectively add heat thereto.

A method of brewing coffee or tea according to one aspect of the invention comprises the steps of: providing a carafe assembly including a container configured to hold the brewed coffee or tea; coupling a brewing assembly to the container of the carafe assembly for brewing of coffee or tea, wherein the brewing assembly comprises a mesh filter assembly and an agitation mechanism; placing coffee ground or tea leaves within the container supported on the mesh filter assembly; placing hot water to be brewed in the container; manually operating the agitating mechanism for agitating the coffee grounds or tea leaves and associated brewing coffee or tea during brewing; removing the brewing assembly from the container wherein the mesh filter assembly provides for separation of the coffee grounds or tea leaves from the brewed coffee or tea during removal of the brewing assembly; and selectively heating the carafe assembly via a heating assembly that selectively supports the carafe assembly.

The coffee and tea brewing system according to inventions provides that in one embodiment that the brewing assembly includes a brewing lid engagable with an open top of the container of the carafe assembly, wherein the brewing lid includes an integral fill aperture and a removable fill plug allowing for convenient filling of the container of the carafe. The coffee and tea brewing system according to one aspect of the invention may provide that the brewing assembly includes a downwardly extending stir rod which is slidingly inserted through an aperture portion of the brewing lid and coupled to the mesh filter assembly and the agitation mechanism, wherein the agitation mechanism includes a paddle affixed at its intermediate portion to the stir rod and extending perpendicularly outward therefrom, and wherein the brewing assembly includes a paddle knob coupled to a distal upper end of the stir rod and allows for manual rotation of the paddle, and wherein the mesh filter assembly is coupled to a lower distal end of the stir rod and includes a plurality of included mesh filter sections and an outer lip seal around a perimeter edge, wherein a diameter of the lip seal is configured to form a water-tight seal against an inner surface of the container. In one optional aspect of the invention, the mesh filter assembly includes a disposable paper filter held in position against a bottom surface of the mesh filter sections via a retainer ring.

The coffee and tea brewing system according to one aspect of the invention further including a serving lid configured to fit an open top of the container of the carafe assembly for serving the brewed coffee or tea, wherein the serving lid includes a serving lid knob, a service lid extension extending into the open top of the container of the carafe assembly, a service lid pour cutout in the extension configured to be aligned with a spout of the container for serving the coffee or tea, and an optional mesh screen on the extension spanning the pour cutout.

The coffee and tea brewing system according to one aspect of the invention provides that the heating assembly provides a flow of steam heat around a portion of the carafe assembly, and wherein the heating assembly is an electrical heating device including a user settable timing control mechanism.

The coffee and tea brewing system according to one aspect of the invention provides wherein the heating assembly includes a carafe bracket configures to stabilize the carafe assembly upon the heating assembly while also directing steam over portions of the carafe assembly, wherein the carafe bracket is a hollow cylinder-shaped vertical structure having a bracket flange portion across a bottom surface, and wherein the bracket flange includes integrally-formed steam apertures and hemispherical protrusions.

BRIEF DESCRIPTION OF THE FIGURES

The advantages and features of the present invention will become better understood with reference to the following more detailed description and claims taken in conjunction with the accompanying drawings, in which like elements are identified with like symbols, and in which:

FIGS. 5 B-D are elevation views of the coffee and tea brewing and heating system of FIG. 5A; and FIGS. 6 A-B are elevation views of the carafe of the coffee and tea brewing and heating system of FIG. 1.

DESCRIPTION OF THE PREFERRED EMBODIMENTS

The best mode for carrying out the invention is presented in terms of its preferred embodiment, herein depicted within FIGS. 1 through 6A-B. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope. The terms "a" and "an" herein do not denote a limitation of quantity, but rather denote the presence of at least one of the referenced items.

The present invention describes a coffee brewing and heating system (herein described as the "system") 10, which provides a system 10 for brewing coffee grounds in a carafe assembly 20, filtering out the coffee grounds, and conveniently maintaining brewed coffee 120 within the carafe assembly 20 at serving temperature.

Figure 1:
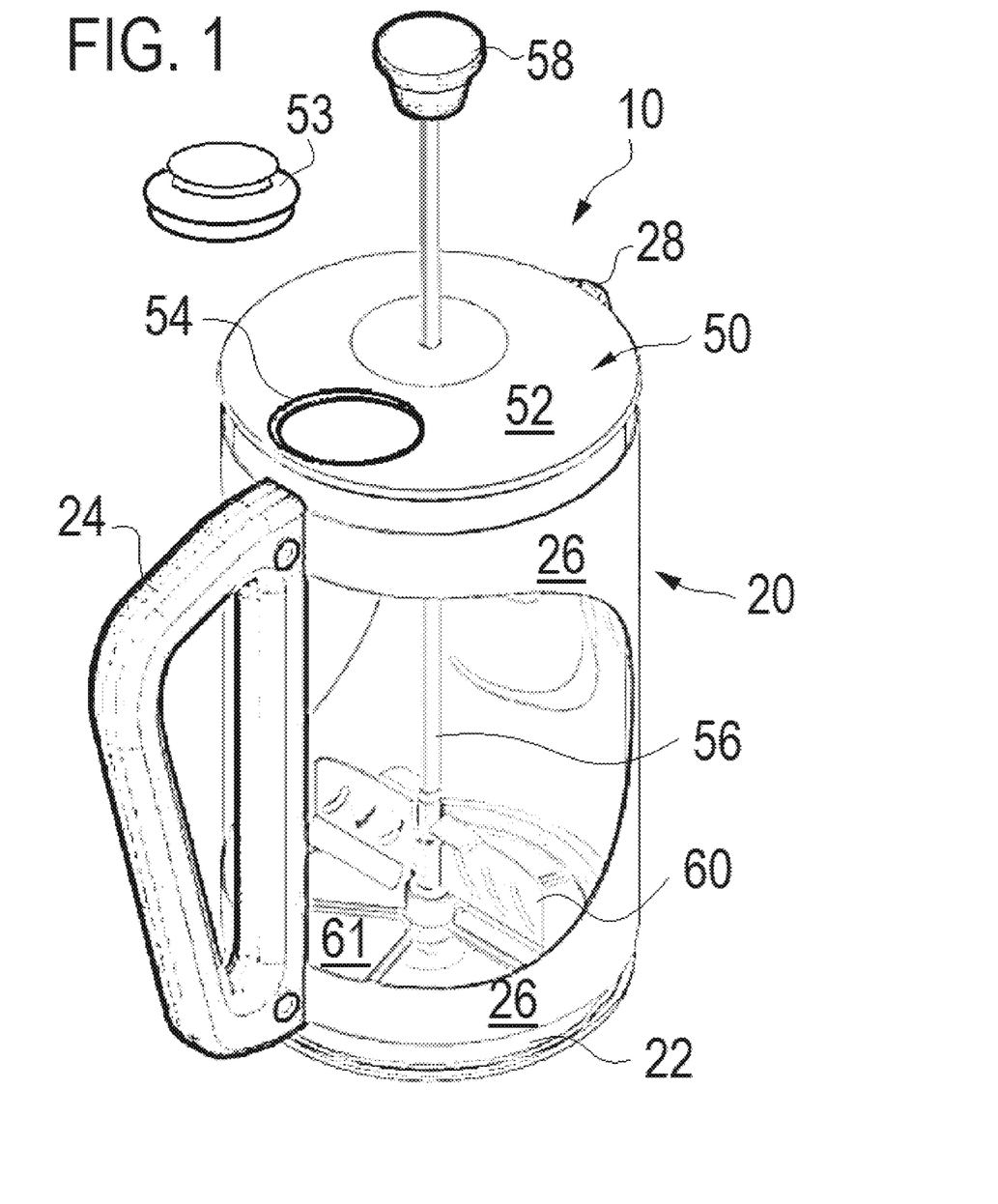
FIG. 1 is a perspective view of a carafe and brewing assembly portion of a coffee and tea brewing and heating system depicting a brewing state, according to one embodiment of the present invention.
Figure 2:
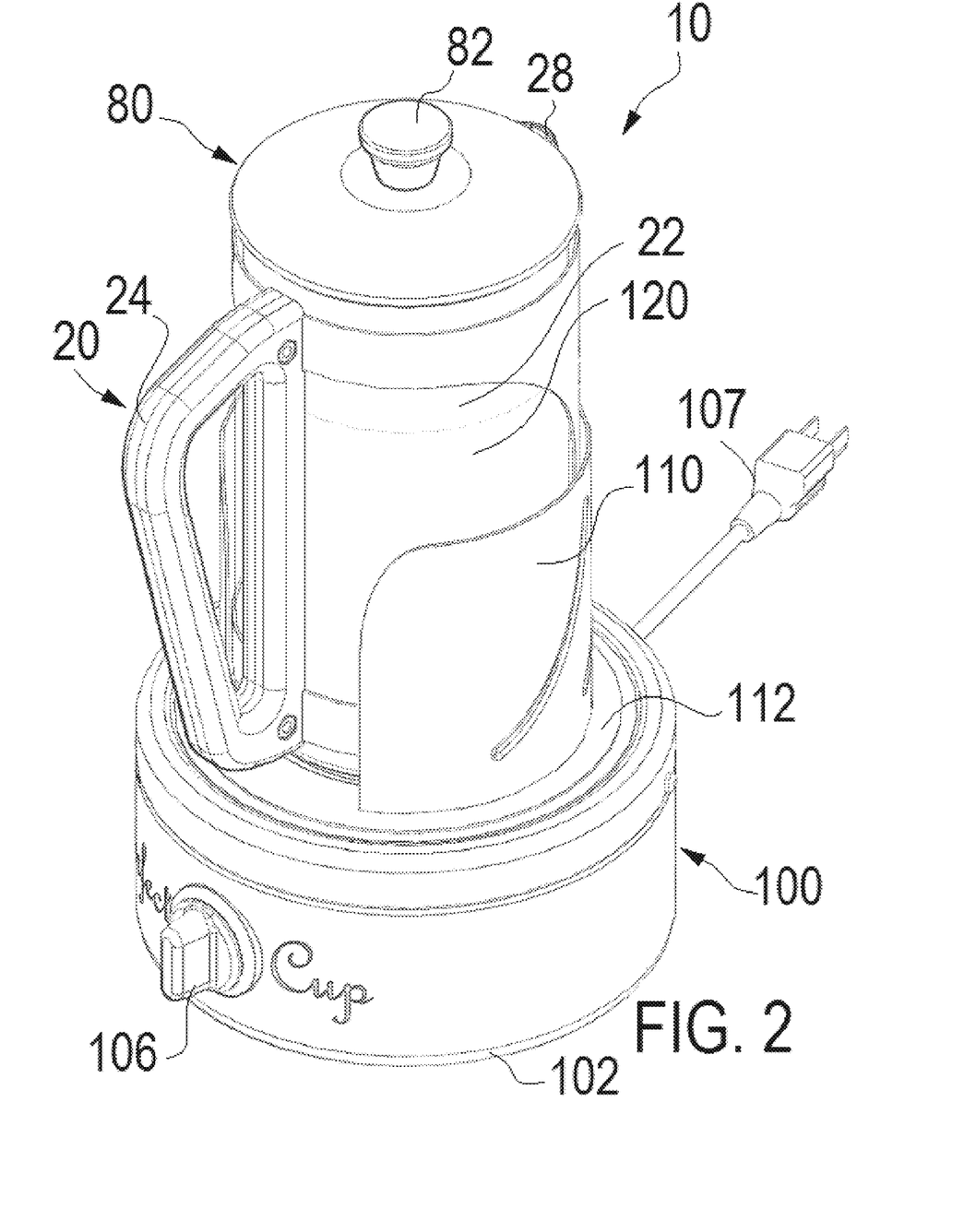
FIG. 2 is a perspective view of the carafe and heating assembly of the coffee and tea brewing and heating system according to FIG. 1 depicting a heating state.

Referring now to FIGS. 1 and 2, perspective views of the system 10 in a brewing state and a heating state, according to the preferred embodiment of the present invention, are disclosed. The system 10 includes a carafe assembly 20, a brewing assembly 50, a serving lid 80, and a heating assembly 100.

As seen in FIG. 1, the carafe assembly 20 includes a transparent cylindrical container 22. The container 22 provides an open-top vessel capable of containing multiple cups of brewed coffee 120. The transparent open top container may be made of suitable plastics or, more preferably a high-temperature glass material. Cost and temperature suitability are not the only consideration for the material of the container 22 as other factors may be considered, such as thermal insulation to minimize temperature loss of the coffee or tea. Additionally coffee and tea aficionados will often prefer glass over plastic for perceived taste (other materials such as ceramics are desirable brewing vessels to those will discriminating preferences, but these do not yield the transparency desired and are not preferred, but are certainly possible for forming the container 22). The container 22 includes a conventional pour spout 28. The carafe assembly 20 includes a handle 24, generally wooden or plastic, and having an ergonomic shape such as a "D"-shaped structure, or the like, being tightly retained upon the glass container 22 by a handle strap 26, being affixed to the handle 24 and extending around and encompassing the container 22, thereby providing a secure mechanism to transport the carafe assembly 20. The handle strap 26 is envisioned to be of a stylish design, such as formed out of polished or burnished metal or out of leather, so as to give the carafe assembly 20 a pleasing aesthetic appearance while providing a clear view in select locations of the brewed coffee 120 within the container 22.

The round top opening of the container 22 allows sealed insertion of the brewing assembly 50 which includes a brewing lid 52 with an extension member extending into the container 22. A rubber or high friction gasket around the extension member shown can improve the friction fit of the brewing assembly 50 and minimize undesirable slippage in use. The brewing assembly 50 includes a plastic or wooden paddle knob 58 coupled to the upper distal end of a stir rod 56. The brewing assembly includes a paddle 60 coupled to the stir rod 56 adjacent a mesh filter assembly 61. The brewing lid 52 provides for conveniently filling the carafe assembly 20 with coffee grounds or tea leaves and hot water from a suitable source, via an integral fill aperture 54 along a top surface, and a removably attached rubber or plastic snap fit fill plug 53. The paddle 60 and mesh filter assembly 61 are mounted at a bottom distal end portion of the stir rod 56 and act to support a quantity of coffee grounds or tea leaves, whereupon the grounds or tea leaves may be manually agitated by the paddle 60, as desired, to produce brewed coffee 120 (or brewed tea).

As seen in FIG. 2, the system 10 provides a device or heating assembly 100 to heat and position the carafe assembly 20 for serving of the brewed coffee 120 when desired. The carafe assembly 20 is illustrated here having a serving lid 80 and an electric heating assembly 100. Following brewing, the brewing assembly 50 is slowly lifted and removed from the carafe assembly 20. Removal of the brewing assembly 50 allows the grounds or tea leaves to be filtered via the mesh filter assembly 61 portion, enabling the filtered brewed coffee 120 (or brewed tea) to remain within the carafe assembly 20. A serving lid 80 is then placed upon the carafe assembly 20, and the carafe assembly 20 is placed within a carafe bracket 110 located upon the heating assembly 100. The heating assembly 100 provides a supply of steam heat to the carafe assembly 20 so as to retain the brewed coffee 120 at a temperature suitable for normal serving.

The system 10 is envisioned to be manufactured in different volumetric sizes based upon a user's preference, and as such should not be interpreted as a limiting factor of the invention.

Figure 3A:
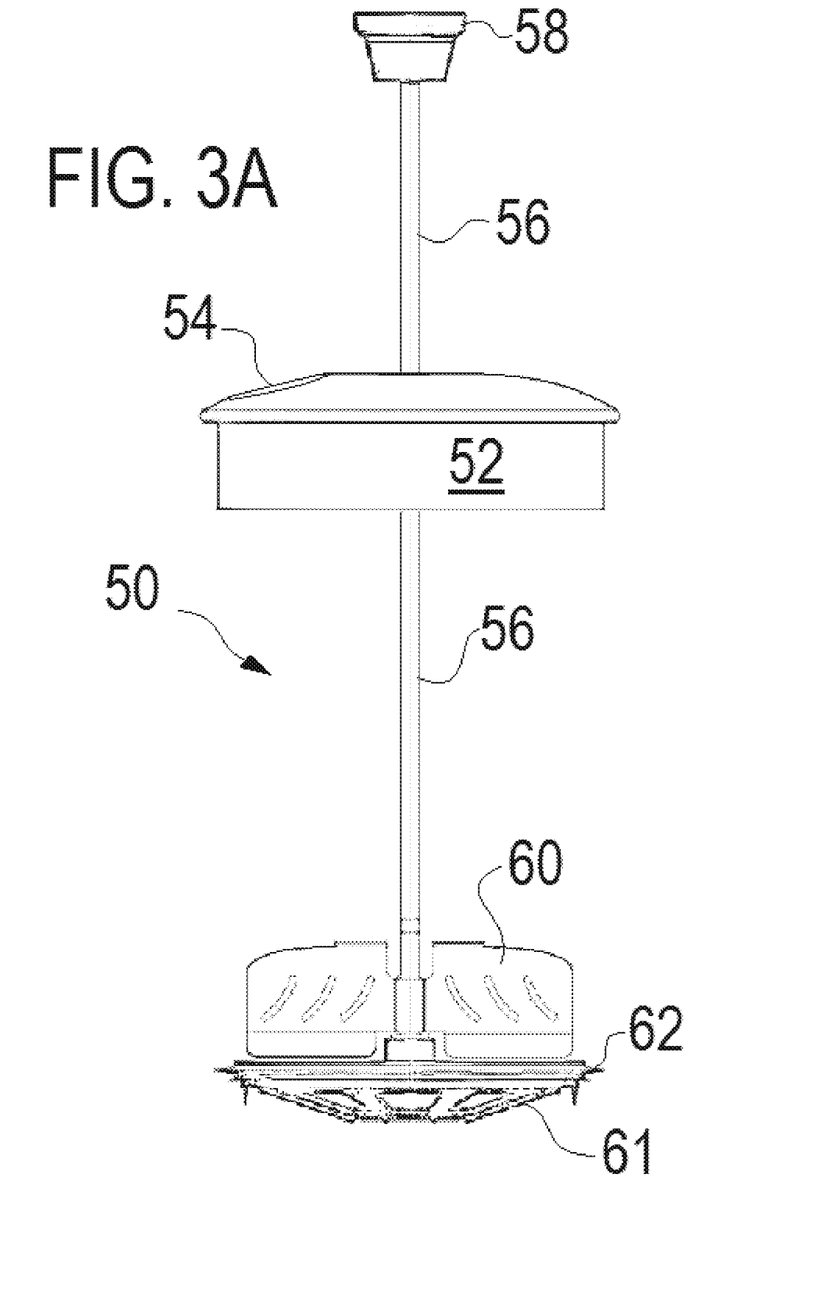
FIG. 3A is an elevational side view of the brewing assembly portion of the coffee and tea brewing and heating system according to a preferred embodiment of the present invention.
Figure 3B:
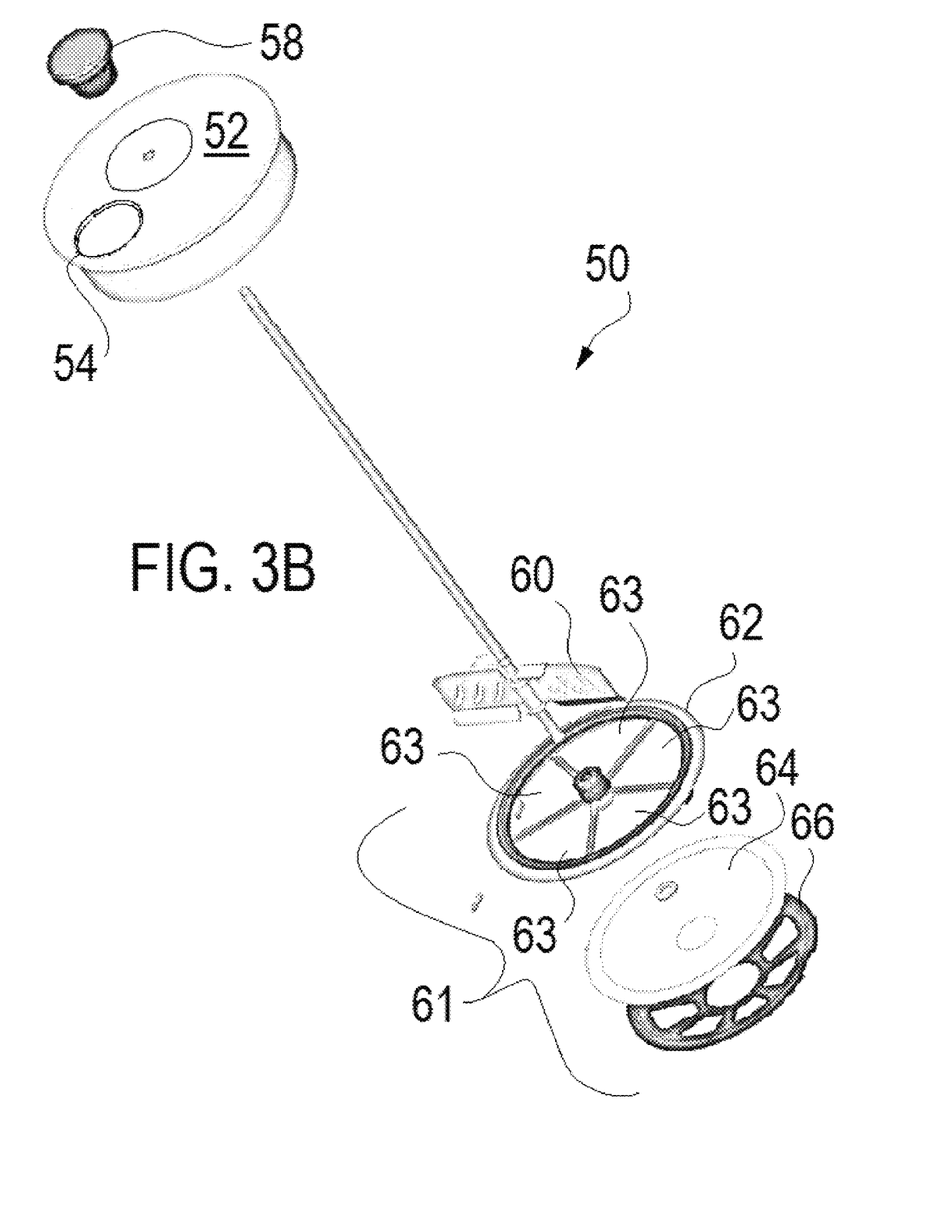
FIG. 3B is an exploded perspective view of the brewing assembly portion of FIG. 3A.
Figure 3C:
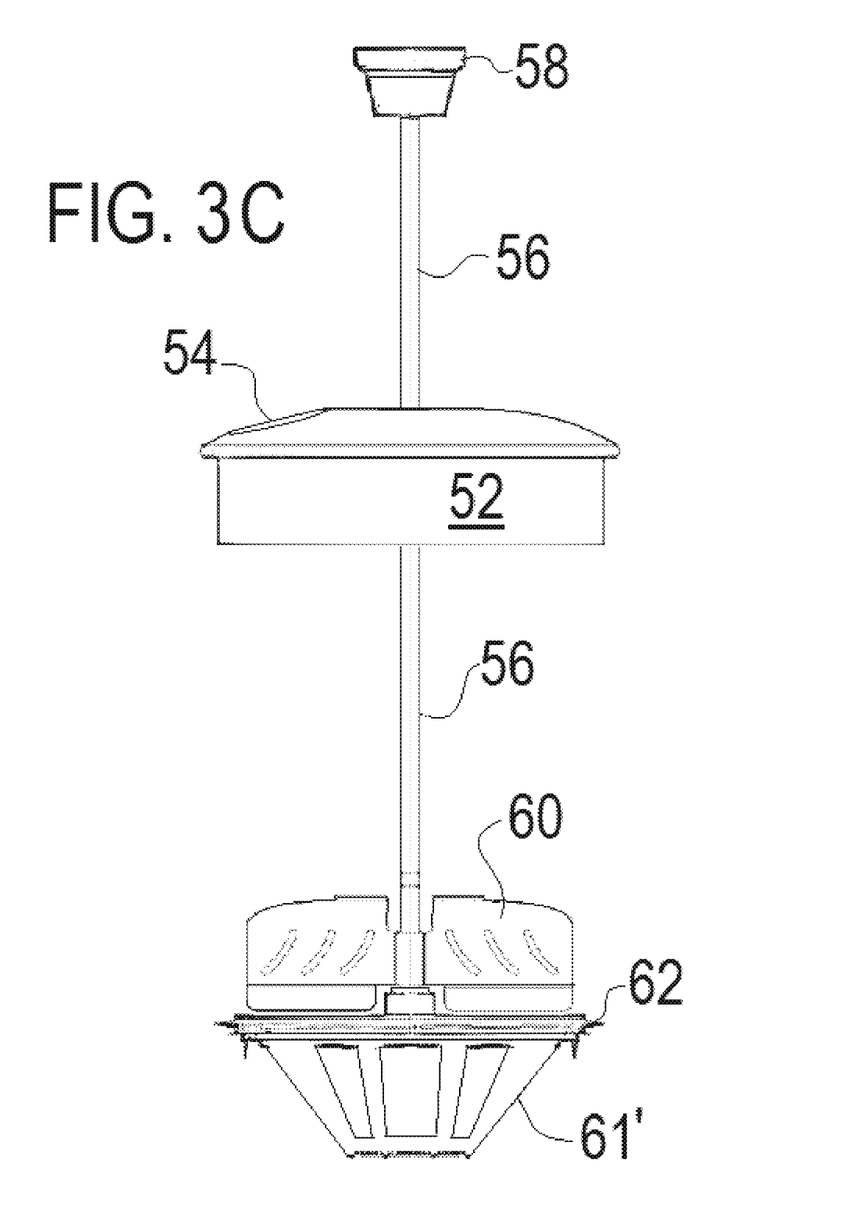
FIG. 3C is an elevational side view of a modified brewing assembly portion of FIG. 3A.

Referring now to FIG. 3A-C, the details of the brewing assembly portion 50 of the system 10, according to the preferred embodiments of the present invention, are disclosed. The brewing assembly 50 provides a brewing lid 52 having an integral fill aperture 54 and a fill plug 53 for convenient hot water filling of the carafe assembly 20. The brewing assembly 50 also includes a downwardly extending stir rod 56 which is slidingly inserted through an aperture portion of the brewing lid 52, which may include a nylon or other suitable bushing, and retained therein by a paddle knob portion 58 affixed to a top distal end of the stir rod 56.

The stir rod 56 further includes features being affixed to a bottom end portion including a paddle 60 and a mesh filter assembly 61. The paddle 60 provides a propeller-like planar structure being permanently affixed at its intermediate portion to the stir rod 56 and extending perpendicularly outward. The paddle 60 is positioned parallel to, and superjacent to a top surface of mesh filter assembly 61.

The mesh filter assembly 61 provides a disc-shaped plastic structure including a plurality of included mesh filter sections 63. The mesh filter assembly 61 also includes a lip seal 62 all around a perimeter edge. The diameter of the lip seal 62 is such so as to form a water-tight seal against an inner surface of the container 22. Upon lifting and removing the brewing assembly 50, the lip seal 62 together with the mesh filter sections 63 act to filter and separate the coffee grounds from the brewed coffee 120, so as to remain upon a top surface portion of the mesh filter assembly 61. The mesh filter assembly 61 and the extension member of the brewing lid may be constructed to sealingly engage when the stir rod 56 is pulled up to advance the mesh filter assembly the entire way to removeably seal the grounds or tea leaves in the then adjacent lid 52 and mesh filter assembly 61. A tactile and audible click, such as via a projection on the stir rod 56 that engages with the bushing or similar feature, may be added to give the user feedback that the mesh filter media 61 is sufficiently advanced to complete the separation process so that the brewing assembly may be removed.

The paddle 60 provides a mechanism for a user to manually agitate the coffee grounds during brewing by rotating the paddle knob 58, thereby rotating the affixed paddle 60 and mesh filter assembly 61 portions. Minor agitation of the coffee grounds or tea leaves during suspension in the hot water is known to facilitate the brewing process to produce the brewed coffee 120 or tea. Hot water is certainly the most common brewing liquid by far but it is not the only medium for brewing teas and coffees, but it is sufficient for the description for the present invention.

Additional filtering of the brewed coffee 120 or tea is provided by optionally utilizing a disposable paper filter 64 which is held in position against a bottom surface of the mesh filter assembly 61 via a snap-on plastic retainer ring 66. The additional paper filter may only be needed or desirable with finer ground coffee and tea leaves. The ability to add additional filters 64 in an easy effective manner adds great flexibility to the operation of the present invention.

FIG. 3C illustrates a modified brewing assembly portion of FIG. 3A in which the modification is a more conical shaped mesh filter assembly 61' than the more disc shaped mesh filter assembly of FIG. 3A. The increase in the angle of the mesh filter assembly shown in mesh filter assembly 61' will increase the mesh surface area thus increasing the flow rate there through, and the conical shape can act as a container for the grounds or tea leaves and keep them off of the seal 62. There are minor hydraulic advantages to the shape of FIG. 3A, and both are shown as each are effective in the present invention.

Figure 4:
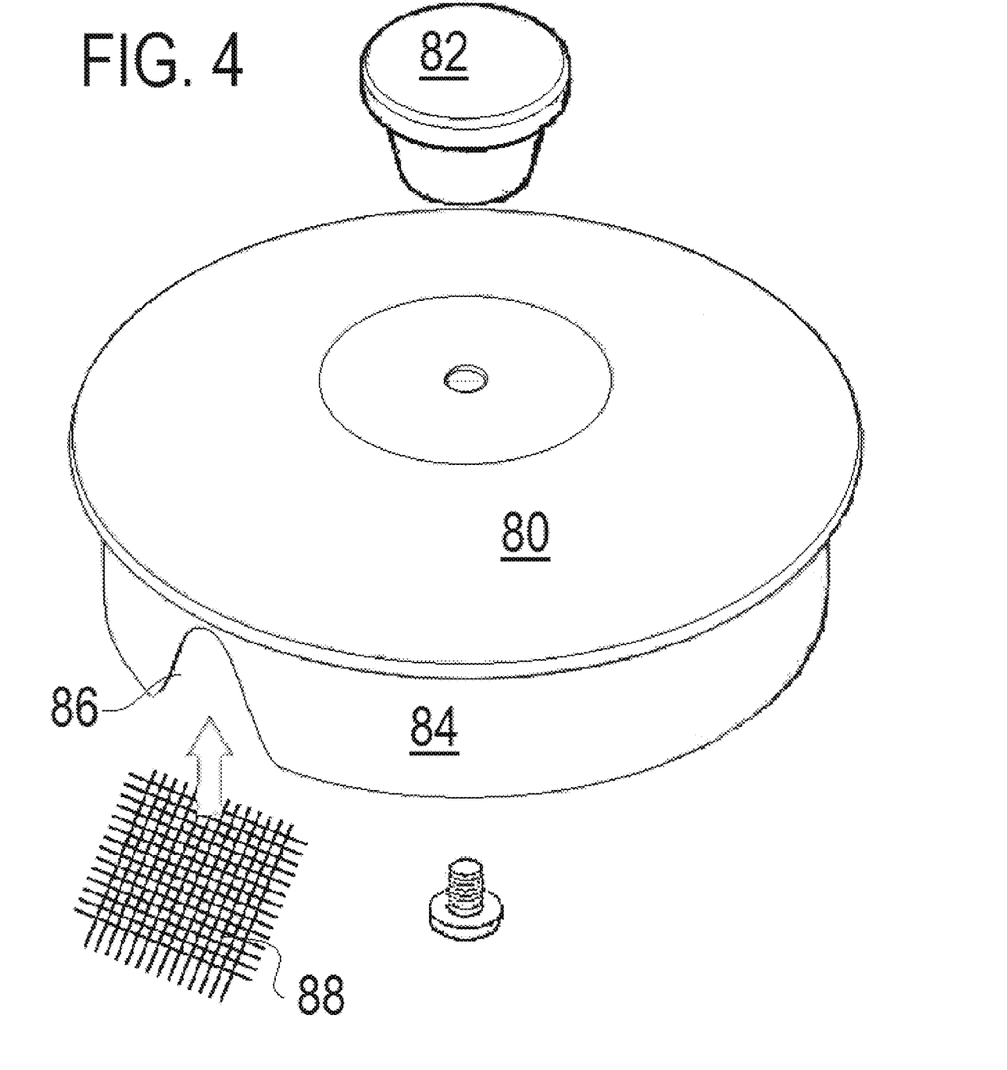
FIG. 4 an exploded perspective view of a serving lid of the coffee and tea brewing and heating system according to FIG. 1.
Figure 5A:
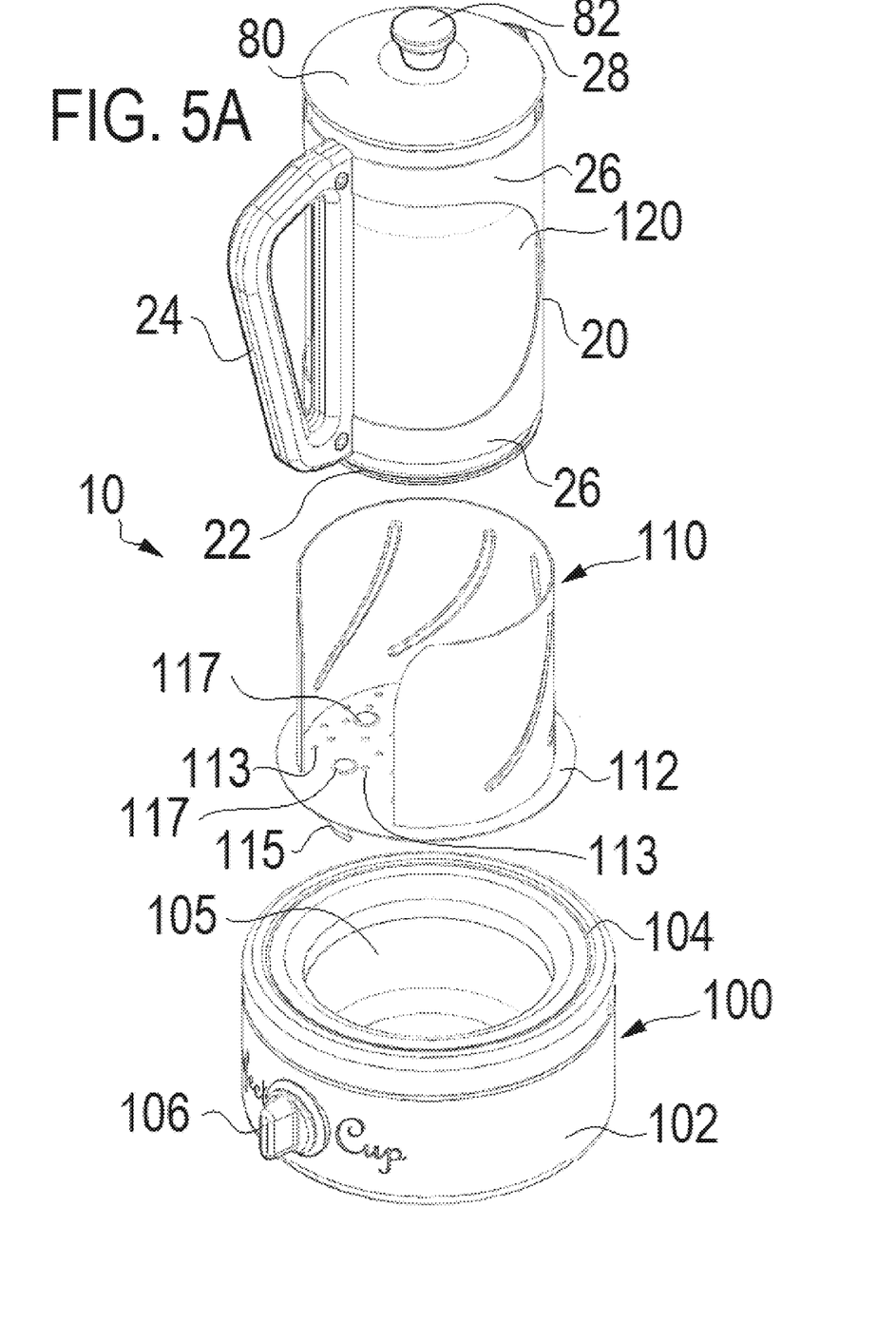
FIG. 5A is an exploded view of the a coffee and tea brewing and heating system of FIG. 1.
Figure 5B:
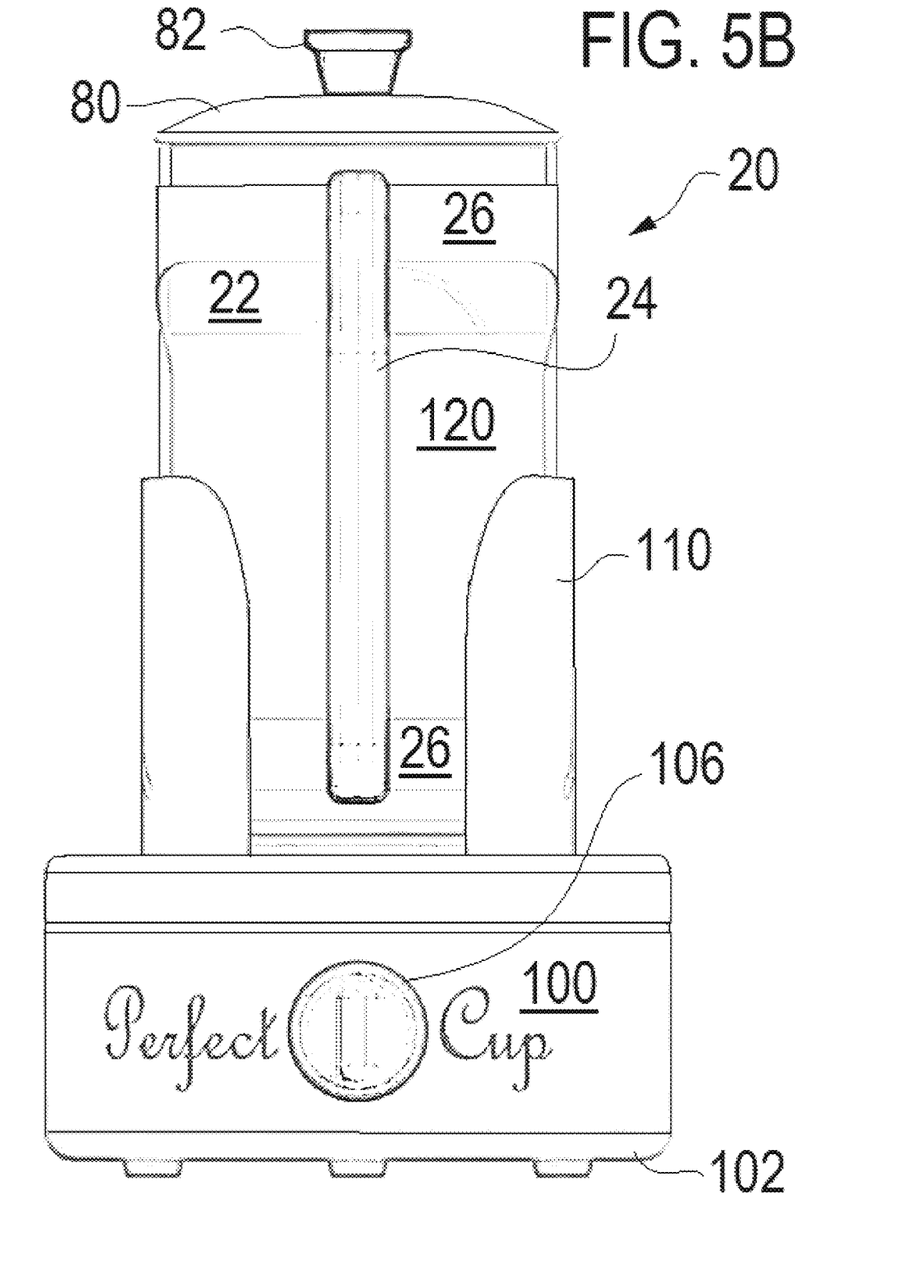
Figure 5C:
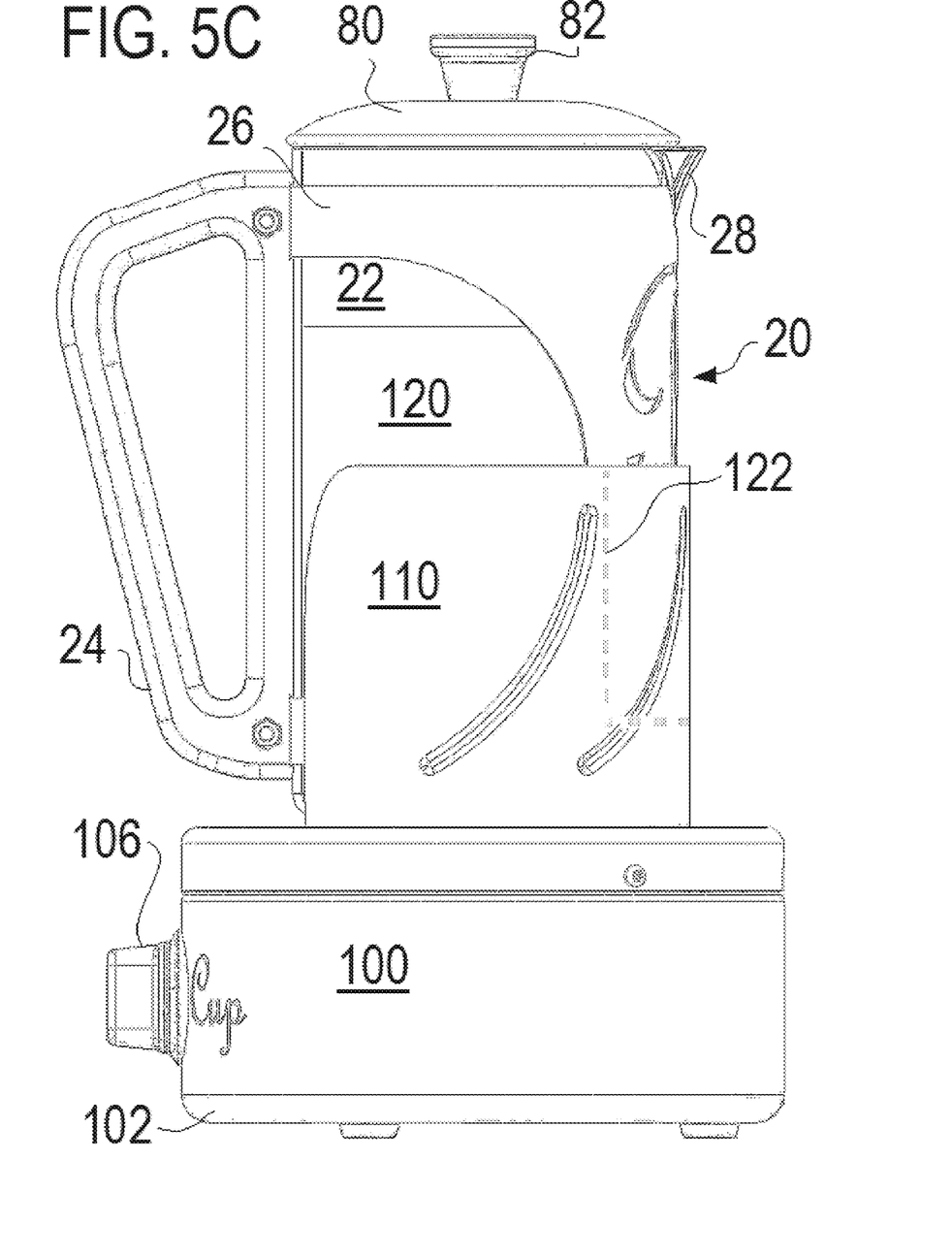
Figure 5D:
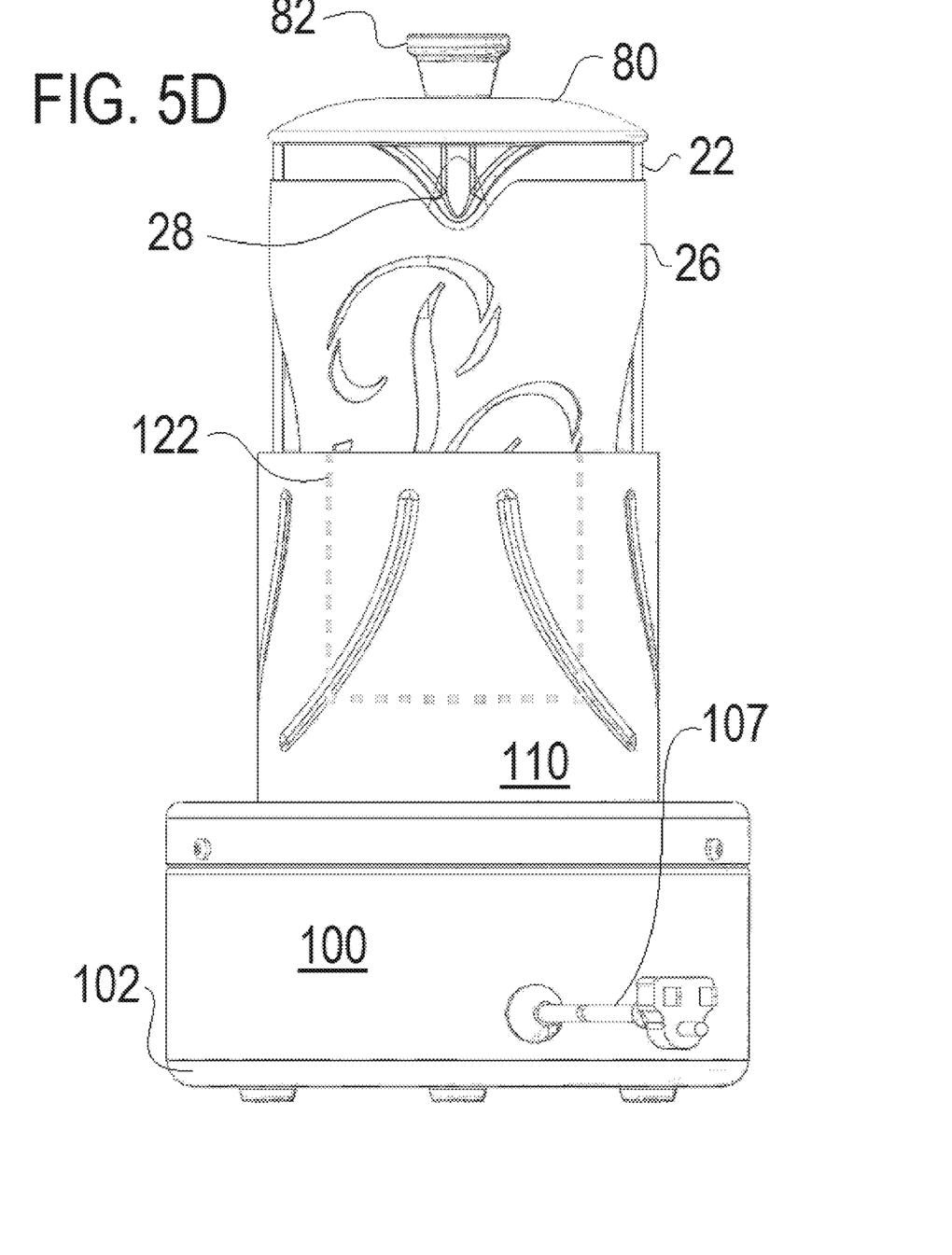
Figures 6A, 6B:
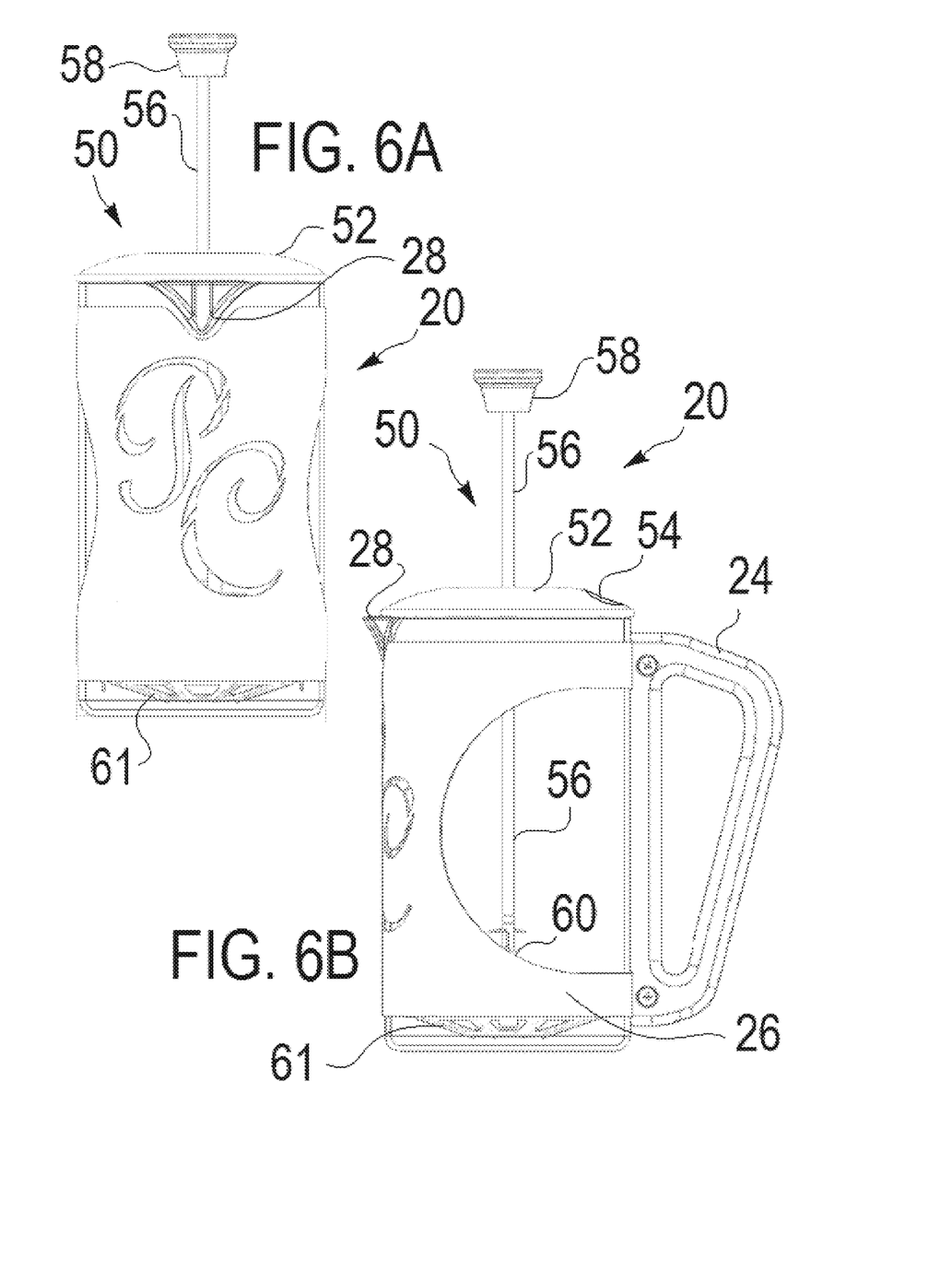

Referring now to FIG. 4, the details of the serving lid 80 are shown. The serving lid 80 is generally a conventional lid sized specifically for the open top of the container 22 of the carafe assembly 20. The serving lid 80 may be conventionally formed out of plastic or metal 82 and includes a serving lid knob 82, a service lid extension 84 extending into the open top of the container 22 of the carafe assembly 20 and which may include a gasket to assist with forming a tight fit therewith. Additionally the serving lid 80 includes a service lid pour cutout 86 in the extension 84 configured to be aligned with the spout 28 for serving the coffee or tea. The lid 80 may also include an optional mesh screen 88 that is placed on the extension 84 spanning the pour cutout 86.

FIGS. 2 and 5A-D show the coffee heating assembly portion 100 of the system 10, according to a preferred embodiment of the present invention. The coffee heating assembly 100 provides a mechanism to hold and heat the carafe assembly 20 following the previously described brewing process. The coffee heating assembly 100 provides a flow of steam heat around a bottom portion of the carafe assembly 20 for the purpose of maintaining a constant temperature and to preserve a taste of the brewed coffee 120 for an extended period of time. The coffee heating assembly 100 is envisioned to be an electrical heating device including associated components such as, but not limited to: a heating element, an over-temperature thermostat, and a power cord 107. The coffee heating assembly 100 includes a stable cylinder-shaped table-top base 102, a top perimeter rim portion 104 which supports a central removable cup-shaped water reservoir 105, a timer knob 106, and a carafe bracket 110. Temperature control may also be easily added.

The carafe bracket 110 is a hollow cylinder-shaped vertical structure having a bracket flange portion 112 across a bottom surface. The carafe bracket 110 acts to stabilize the carafe assembly 20 upon the heating assembly 100 while also directing steam from the reservoir 105 over the base and side portions of the carafe assembly 20.

In an alternative design the cylinder-shaped vertical structure of the bracket 110 may include a cutout 122 which can increase visibility of the container 22 to show the user how much coffee or tea is remaining and to better accommodate other issues such as handle 24 allowing the carafe assembly 20 to be placed onto the heating assembly 100 in one of two orientations. This feature is sometimes referenced as an ambidextrous feature as allowing for easy right hand and left hand implementation.

The carafe bracket 110 is removably attached to a top edge portion of the cup-shaped reservoir 105 via a plurality of downwardly extending clips 115 which are integral to a bottom surface of the bracket flange 112. The bracket flange 112 also includes integrally-formed steam apertures 113 and hemispherical protrusions 117. The protrusions 117 create a slight gap between the bracket flange 112 and a bottom surface of the carafe assembly 20, thereby allowing the steam which is emitted from the reservoir 105 to flow upwardly through the steam apertures 113 and over the carafe assembly 20.

It is envisioned that other styles and configurations of the present invention can be easily incorporated into the teachings of the present invention, and only one particular configuration shall be shown and described for purposes of clarity and disclosure and not by way of limitation of scope.

Operation

The preferred embodiment of the present invention can be utilized by the common user in a simple and effortless manner with little or no training. After initial purchase or acquisition of the system 10, it would be configured and utilized as described herein and shown in the figures.

The method of configuring and utilizing the system 10 was described generally above in and is repeated in detail herein as it may be achieved by performing the following steps: procuring a model of the system 10 having a desired internal volume and external appearance; placing the carafe assembly 20 upon a countertop or similar stable surface; inserting the brewing assembly 50 approximately one-third (⅓) into the container 22 or coupling the lid 52 to the container 22 with the mesh filter assembly near the top; pouring an amount of coffee grounds (or tea leaves) into the container 22 via the open top or the opening 54 if the lid 52 is attached such that the coffee or tea onto the mesh filter assembly 61 using a suitable measuring cup or spoon; inserting the brewing assembly 50 all the way into the container 22 with the brewing lid 52 coupled to the container 22 and the stir rod 56 fully depressed; adding a desired volume of boiling water (or other desired brewing medium—such as milk for Chai) through the fill aperture 54 from a hot water source such as a tea kettle; inserting the fill plug 53 into the fill aperture 54; turning the paddle knob 58 to rotate the paddle 60 to agitate the coffee grounds, as desired; allowing sufficient time for the coffee or tea to brew; plugging in the heating assembly 100 using the power cord 107; selecting a time setting using the timer knob 106; slowly lifting the brewing assembly 50 upwardly; allowing the brewed coffee 120 to pass through the mesh filter assembly 61 and remain within the container 22; removing the brewing assembly 50 from the carafe assembly 20; setting the brewing assembly 50 aside for cleaning; inserting and securing the carafe bracket 110 into the reservoir 105 using the clips 115, if not previously installed; placing the carafe assembly 20 into the carafe bracket 110; maintaining a temperature of the brewed coffee 120 by allowing the steam generated by the heating assembly 100 to flowing through the steam apertures 113 and up over the carafe; and, benefiting from a convenient and timely method to prepare and serve multiple cups of hot fresh tasting brewed coffee 120 or tea, afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A coffee and tea brewing system comprising:
    A carafe assembly including a container configured to hold the brewed coffee or tea;
    A brewing assembly configured to be selectively coupled to the container of the carafe assembly for brewing of coffee or tea and selectively removed from the container of the carafe assembly when serving the brewed coffee or tea, the brewing assembly comprising a mesh filter assembly configured to allow for separation of the coffee grounds or tea leaves from the brewed coffee or tea, and an agitation mechanism superjacent to a top surface of mesh filter assembly and configured to selectively agitate the coffee grounds or tea leaves and associated brewing coffee or tea during brewing;
    A heating assembly configured to support the carafe assembly and selectively add heat thereto; wherein the brewing assembly includes a brewing lid engagable with an open top of the container of the carafe assembly and a downwardly extending stir rod which is slidingly inserted through an aperture portion of the brewing lid and coupled to the mesh filter assembly and the agitation mechanism.

2. The coffee and tea brewing system according to claim 1 wherein the brewing lid includes an integral fill aperture and a removable fill plug allowing for convenient filling of the container of the carafe.

3. The coffee and tea brewing system according to claim 1 wherein the agitation mechanism includes a paddle affixed at its intermediate portion to the stir rod and extending perpendicularly outward therefrom.

4. The coffee and tea brewing system according to claim 3 wherein the brewing assembly includes a paddle knob coupled to a distal upper end of the stir rod and allows for manual rotation of the paddle.

5. The coffee and tea brewing system according to claim 3 wherein the mesh filter assembly is coupled to a lower distal end of the stir rod and includes a plurality of included mesh filter sections and an outer lip seal around a perimeter edge, wherein a diameter of the lip seal is configured to form a water-tight seal against an inner surface of the container.

6. The coffee and tea brewing system according to claim 3 wherein the mesh filter assembly includes a disposable paper filter held in position against a bottom surface of the mesh filter sections via a retainer ring.

7. The coffee and tea brewing system according to claim 1 further including a serving lid configured to fit an open top of the container of the carafe assembly for serving the brewed coffee or tea.

8. The coffee and tea brewing system according to claim 7 wherein the serving lid includes a serving lid knob, a service lid extension extending into the open top of the container of the carafe assembly, a service lid pour cutout in the extension configured to be aligned with a spout of the container for serving the coffee or tea, and a mesh screen on the extension spanning the pour cutout.

9. The coffee and tea brewing system according to claim 1 wherein the heating assembly provides a flow of steam heat around a portion of the carafe assembly.

10. The coffee and tea brewing system according to claim 9 wherein the heating assembly is an electrical heating device including a user settable timing control mechanism.

11. The coffee and tea brewing system according to claim 9 wherein the heating assembly includes a carafe bracket configures to stabilize the carafe assembly upon the heating assembly while also directing steam over portions of the carafe assembly.

12. The coffee and tea brewing system according to claim 11 wherein the carafe bracket is a hollow cylinder-shaped vertical structure having a bracket flange portion across a bottom surface.

13. The coffee and tea brewing system according to claim 1 wherein the container of the carafe assembly is formed as a transparent open topped cylindrical container capable of containing multiple cups of brewed coffee formed of high-temperature glass material, wherein the container includes a conventional pour spout, a D shaped handle tightly retained upon the glass container by a metal handle strap affixed to the handle and extending around and encompassing the container.

14. A coffee and tea brewing system comprising:
A carafe assembly including a container configured to hold the brewed coffee or tea;
A brewing assembly configured to be selectively coupled to the container of the carafe assembly for brewing of coffee or tea and selectively removed from the container of the carafe assembly when serving the brewed coffee or tea, the brewing assembly comprising a mesh filter assembly configured to allow for separation of the coffee grounds or tea leaves from the brewed coffee or tea, and an agitation mechanism configured to selectively agitate the coffee grounds or tea leaves and associated brewing coffee or tea during brewing; and
A heating assembly configured to support the carafe assembly and selectively add heat thereto, wherein the heating assembly provides a flow of steam heat around a portion of the carafe assembly, wherein the heating assembly includes a carafe bracket configures to stabilize the carafe assembly upon the heating assembly while also directing steam over portions of the carafe assembly, wherein the carafe bracket is a hollow cylinder-shaped vertical structure having a bracket flange portion across a bottom surface, and wherein the bracket flange includes integrally-formed steam apertures and hemispherical protrusions.

* * * * *